(12) United States Patent
James

(10) Patent No.: US 8,108,148 B2
(45) Date of Patent: Jan. 31, 2012

(54) METHOD AND SYSTEM FOR MAPPING ENVIRONMENTS CONTAINING DYNAMIC OBSTACLES

(75) Inventor: Michael Robert James, Northville, MI (US)

(73) Assignee: Toyota Motor Engineering & Manufacturing, North America, Inc., Erlanger, KY (US)

( * ) Notice: Subject to any disclaimer, the term of this patent is extended or adjusted under 35 U.S.C. 154(b) by 486 days.

(21) Appl. No.: 12/395,574

(22) Filed: Feb. 27, 2009

(65) Prior Publication Data

US 2010/0223007 A1 Sep. 2, 2010

(51) Int. Cl.
G01C 21/00 (2006.01)

(52) U.S. Cl. ........ 701/450; 340/435; 340/436; 180/167; 180/168; 180/169

(58) Field of Classification Search ............... 701/23
See application file for complete search history.

(56) References Cited

U.S. PATENT DOCUMENTS

| | | | |
|---|---|---|---|
| 4,949,277 A | 8/1990 | Trovato et al. | |
| 5,006,988 A | 4/1991 | Borenstein et al. | |
| 5,170,352 A | 12/1992 | McTamaney et al. | |
| 5,544,282 A | 8/1996 | Chen et al. | |
| 5,680,313 A | 10/1997 | Whittaker | |
| 6,018,308 A | 1/2000 | Shirai | |
| 6,205,380 B1 | 3/2001 | Bauer et al. | |
| 6,470,271 B2 | 10/2002 | Matsunaga | |
| 6,728,608 B2 | 4/2004 | Ollis et al. | |
| 7,248,968 B2 | 7/2007 | Reid | |
| 7,253,835 B2 | 8/2007 | Chen | |
| 2004/0158355 A1 | 8/2004 | Holmqvist et al. | |
| 2005/0015201 A1 | 1/2005 | Fields et al. | |
| 2005/0131581 A1 | 6/2005 | Sabe et al. | |
| 2006/0025888 A1 | 2/2006 | Gutmann et al. | |
| 2006/0058931 A1 | 3/2006 | Ariyur et al. | |
| 2006/0241827 A1 | 10/2006 | Fukuchi et al. | |
| 2007/0280528 A1 | 12/2007 | Wellington et al. | |
| 2007/0293985 A1 | 12/2007 | Myeong et al. | |
| 2008/0015777 A1 | 1/2008 | Heimberger et al. | |
| 2008/0046125 A1 | 2/2008 | Myeong et al. | |
| 2008/0074312 A1 | 3/2008 | Cross et al. | |

FOREIGN PATENT DOCUMENTS

JP 2006011880 1/2006

*Primary Examiner* — Valerie Lubin
(74) *Attorney, Agent, or Firm* — Snell & Wilmer LLP

(57) ABSTRACT

The present invention relates to a method and system for mapping environments containing dynamic obstacles. In one embodiment, the present invention is a method for mapping an environment containing dynamic obstacles using a processor including the steps of forming a current instantaneous map of the environment, determining cells which are free space within the current instantaneous map, determining cells which are occupied space within the current instantaneous map, and integrating the current instantaneous map with an old integrated map of the environment to form a new integrated map of the environment.

18 Claims, 7 Drawing Sheets

METHOD AND SYSTEM FOR MAPPING ENVIRONMENTS CONTAINING DYNAMIC OBSTACLES

BACKGROUND

1. Field

The present invention relates to a method and system for mapping environments containing dynamic obstacles.

2. Description of the Related Art

When using a conventional detection unit to generate a map of an environment, the map plots where the obstacles are and where there are no obstacles in the environment. However, the conventional detection unit cannot access every location of the environment as obstacles frequently block one or more paths of the detection unit. Furthermore, obstacles can be dynamic resulting in obstacles which were previously un-obscured, being partially or completely obscured. The dynamic obstacles can also mean that obstacles which were previously present are now not present. The conventional detection unit, however, leaves the obstacle or portions of the obstacle in the map of the environment even when the obstacle has moved when the obstacles is partially or completely obscured. This can lead to a number of obstacles appearing in the map of the environment which do not actually exist because they have since moved to a different location.

Thus, there is an unrecognized need for a more accurate method and system for mapping environments containing dynamic obstacles.

SUMMARY

In one embodiment, the present invention is a method for mapping an environment containing dynamic obstacles using a processor including the steps of forming a current instantaneous map of the environment, determining cells which are free space within the current instantaneous map, determining cells which are occupied space within the current instantaneous map, and integrating the current instantaneous map with an old integrated map of the environment to form a new integrated map of the environment.

In another embodiment, the present invention is a method for mapping an environment of an automobile containing dynamic obstacles using a processor including the steps of forming a current instantaneous map of the environment, determining free cells which are free space within the current instantaneous map, determining occupied cells which are occupied space within the current instantaneous map using, marking cells in a new integrated map as free space or occupied space based on the corresponding cells in the current instantaneous map, and marking unmarked cells in the new integrated map as free space which are below a first cell and above a second cell, have a same associated horizontal distance as the first cell, and which are located in a vertical line including the first cell that is substantially perpendicular to a ground plane.

In another embodiment, the present invention is a system in an automobile for mapping an environment containing dynamic obstacles including a sensor unit collecting environmental data, a location unit connected to the sensor unit, the location unit outputting location data of the sensor in relation to the environment, and a control unit connected to the sensor unit and the location unit, the control unit generating a new integrated map of the environment based on the environmental data and the location data of the sensor.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
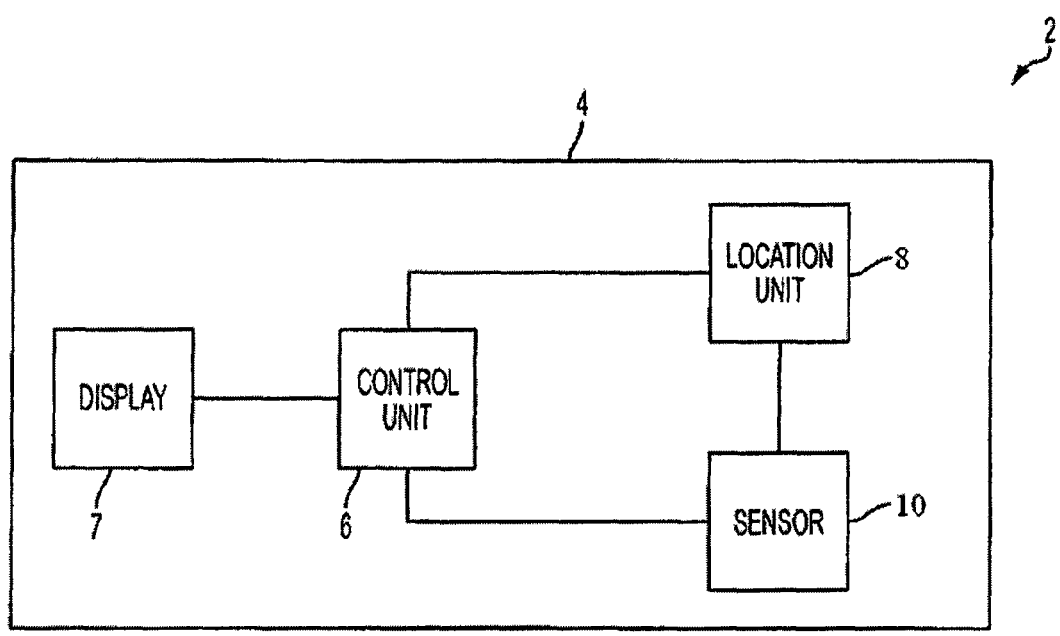
FIG. 1 is a schematic diagram of a dynamic obstacle mapping system.

As seen in FIG. 1, a dynamic obstacle mapping system 2 includes a transportation unit 4. The transportation unit 4 can be, for example, an automobile, an airplane, a motorbike, a bicycle, or any other transportation devices. The transportation unit 4 includes a control unit 6, a display unit 7, a location unit 8 and a sensor 10.

The control unit 6 is connected to the location unit 8 and the sensor 10. The control unit 6 can be or include, for example, a central processing unit, a processor, a computer, an engine control unit, or any other control device. The control unit 6 can also include a memory or other types of storage unit. The control unit 6 can control the location unit 8 and the sensor 10 and control data flow between the location unit 8 and the sensor 10. Furthermore, the control unit 6 can receive data such as environmental data from the sensor 10 and generate a current instantaneous map of the environment, an old integrated map of the environment, and/or a new integrated map of the environment. The control unit 6 can also receive location data from the location unit 8 and utilize the location data to form the current instantaneous map, the old integrated map, and/or the new integrated map.

The display unit 7 is connected to the control unit 8 and can display the current instantaneous map, the old integrated map, and/or the new integrated map. The display can display the old integrated map, the current instantaneous map, and/or the new integrated map, or only a select number of the old integrated map, the current instantaneous map, and/or the new integrated map. Furthermore, the number of times each of the old integrated map, the current instantaneous map, and/or the new integrated map are displayed need not be equal.

The location unit 8 is connected to the control unit 6 and the sensor 10. The location unit 8 can detect a location of the sensor 10 and supply location data to the sensor 10 and/or the control unit 6. The location unit 8 can be, for example, any type of device which can determine a location of the sensor 10 such as a Global Positioning System Unit.

The sensor 10 is connected to the control unit 6 and the location unit 8. The sensor 10 can detect an environment around the transpiration unit 4, including obstacles, as environmental data. The obstacles can be stationary or dynamic. When the obstacles are dynamic, the obstacles can be moving. The sensor 10 can be of any detection device capable of producing environmental data regarding the locations of the obstacles. The sensor 10, for example, can include multiple lasers arranged in various formations and multiple receivers arranged in various formations. In one embodiment, the sensor 10 includes 64 lasers in a vertical plane which can individually or collectively rotate in a plane substantially parallel to a ground plane or transportation unit 4. Furthermore, the lasers within the sensor 10 can be strategically positioned at different angles so that collectively they can cover an angle in a plane perpendicular to the ground plane or the transportation unit 4.

Each of the 64 lasers can send a laser beam and depending on when the laser beam is received by the receivers, shapes and locations of obstacles can be determined. The 64 lasers can be sent individually or simultaneously at various rates. The 64 lasers can each send a laser beam, for example, 10 times per second. Thus, each laser, or sensor 10 collectively, can send a laser beam to collect a first set of environmental data covering the angle in the plane perpendicular to the ground plane or the transportation unit 4, rotate along the plane substantially parallel to the ground plane or the transportation unit 4 and collect a second set of environmental data covering the angle in the plane perpendicular to the ground plane or the transportation unit 4. The process can be repeated until each laser or sensor 10 has sufficiently rotated along the plane substantially parallel to the ground plane or the transportation unit 4 to form an instantaneous map of the environment.

In one embodiment, the instantaneous map of the environment is the current instantaneous map of the environment. In another embodiment, sensor 10 generates multiple instantaneous maps of the environment and integrates the multiple instantaneous maps of the environment to generate the current instantaneous map of the environment. The integration can be, for example, a union of the multiple instantaneous maps of the environment. The integration can also be other suitable algorithms to increase a number of cells within the current instantaneous map which are marked as free space or occupied space instead of unknown space.

Figure 2:
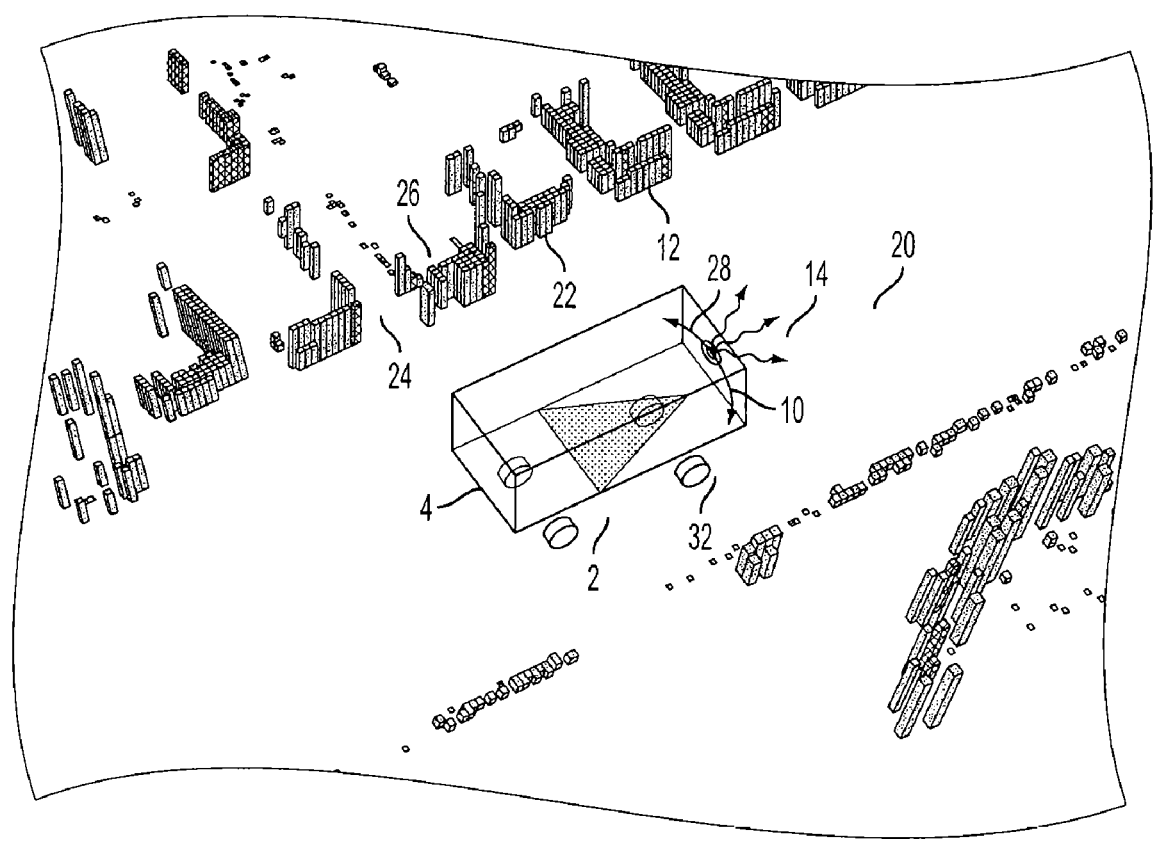
FIG. 2 is a schematic diagram of a dynamic obstacle mapping system in operation.

FIG. 2 is a schematic diagram of the dynamic obstacle mapping system 2 in operation. As seen in FIG. 2, the sensor 10 emits the waves 14 to an environment 20 to detect obstacles 12 and generate environmental data. As seen in FIG. 2, the sensor 10 can rotate in a direction 28 along the plane substantially parallel to a ground plane 32.

The environmental data can indicate that cells in the current instantaneous map can be marked as free space 24 where no obstacles are present, occupied space 22 where obstacles are present, and unknown space 26 where it is unknown whether an obstacle is present or if the space should be free space. The cells marked as free space can be used interchangeably with the term free space cells, the cells marked as occupied space can be used interchangeably with the term occupied space cells, and the cells marked as unknown space can also be used interchangeably with the term unknown space cells.

Unknown space cells can occur, for example, directly behind an obstacle where a laser beam is unable to confirm the presence or lack thereof of another obstacle. Control unit 6 (shown in FIG. 1) can then generate the current instantaneous map from the environmental data which can be used along with the old integrated map to form a new integrated map of the environment. For example, a first current instantaneous map can be integrated with a first old integrated map to form a first new integrated map. The first new integrated map can then be saved as a second old integrated map. A second current instantaneous map can be subsequently generated and then integrated with the second old integrated map to form a second new integrated map. This process can be repeated indefinitely.

Figure 3:
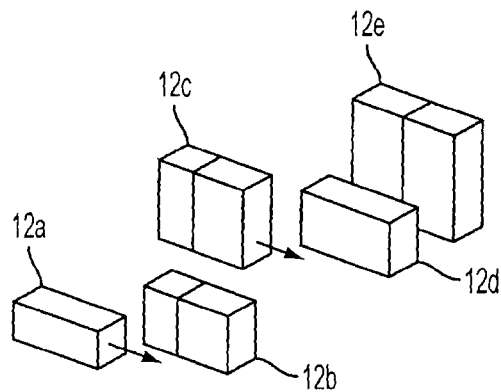
FIG. 3 is a schematic diagram of obstacles moving from a first position to a second position.
Figure 4:
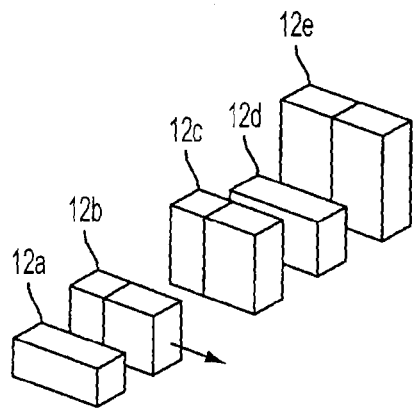
FIG. 4 is a schematic diagram of obstacles in a second position.
Figure 5:
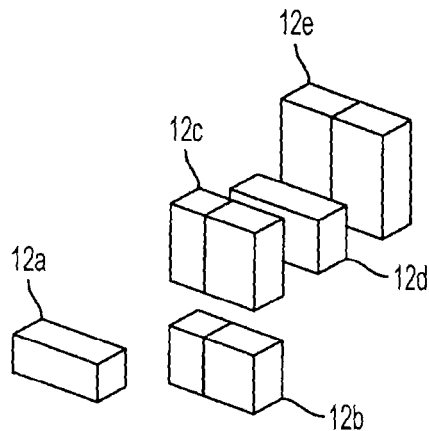
FIG. 5 is a schematic diagram of obstacles in a second position and a third position.

Although the obstacles 12 appear static in FIG. 2, they can be dynamic with a combination of moving and stopping as depicted in FIG. 3, FIG. 4, and FIG. 5. As seen in FIG. 3, an obstacle 12a and an obstacle 12c are in a first position while an obstacle 12b, an obstacle 12d, and an obstacle 12e are in a second position at a first time period. The obstacle 12a and the obstacle 12c, however, can move from the first position to the second position in a second time period as seen in FIG. 4. In FIG. 4, all of the obstacles 12 are in the second position. In FIG. 5, however, only the obstacle 12b moves from the second position to a third position in a third time period. The obstacle 12c remains in the second position in the third time period.

Figure 6:
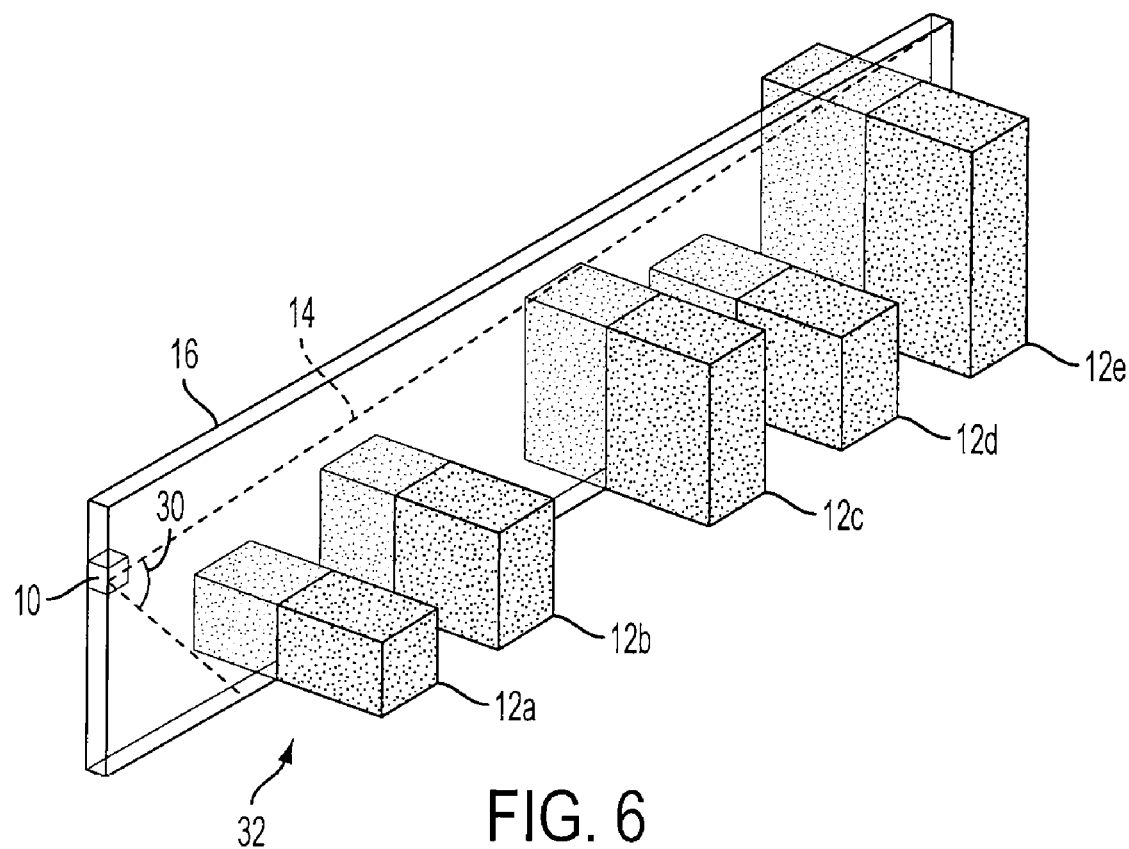
FIG. 6 is a schematic diagram of a sensor in operation collecting environmental data.

In FIG. 6, the sensor 10 emits the waves 14 covering an angle 30 along a plane 16 which is perpendicular to the ground plane 32 to determine a location of the obstacles 12. FIG. 6 depicts the sensor 10 taking environmental data for a single location in a single current instantaneous map. However, as seen in FIGS. 3-5, the obstacles 12, such as the obstacle 12b and the obstacle 12c, can be moving. Thus, the obstacles 12 can appear or disappear from one current instantaneous map to another current instantaneous map. Furthermore, as seen in FIGS. 3-5, each of the obstacles has different heights and can obscure the obstacle behind it. For example, the obstacle 12c is taller than the obstacle 12d and can obscure the obstacle 12d from the sensor 10. Furthermore, the obstacle 12b, while shorter than the obstacle 12c, can partially obscure the lower portions of the obstacle 12c. The obstacles 12 or portions of obstacles 12 which are obscured are in unknown space in the current instantaneous map. Conventionally, an unknown space cell in the current instantaneous map is marked as occupied space in the new integrated map if the corresponding space in the old integrated map is marked as occupied space. However, this can lead to a large number of unknown space cells being marked as occupied space in the new integrated map even when there is currently no obstacle in the unknown space.

The present invention, however, allows a better determination of whether to allow the unknown space cells to remain as unknown space cells, mark the unknown space cells as free space, or mark the unknown space cells as occupied space containing an obstacle in the new integrated map when the current instantaneous map is integrated with the old integrated map to form the new integrated map. The present invention utilizes free space analysis including two observations regarding unknown space and occupied space readings to reduce an amount of unknown space which are erroneously marked as occupied space containing an obstacle.

The first observation is the vertically-contiguous obstacles observation which state that two sensor readings at the same horizontal position but at different heights typically correspond to a common obstacle. The second observation is the ground plane observation which states that dynamic obstacles typically extend vertically from the ground plane and travel on the ground plane. These two observations can be utilized in the formation of the new integrated map for the environment in FIG. 4 and FIG. 5.

Figure 13:
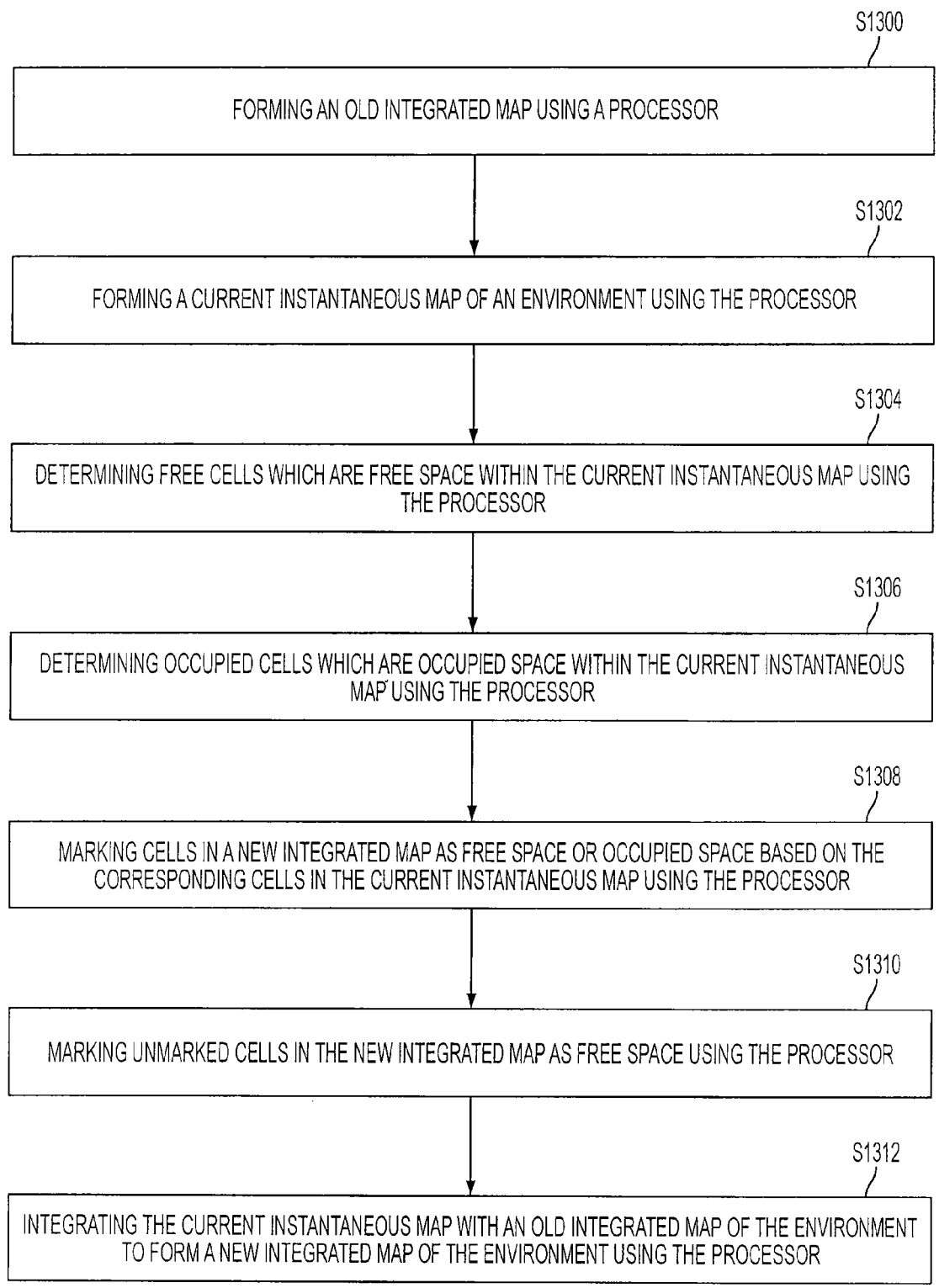
FIG. 13 is a flow chart of a method for mapping environments containing dynamic obstacles according to an embodiment of the present invention.

To form a new integrated map of the environment at the second time period depicted in FIG. 4, an old integrated map of the environment at the second time period is integrated with a current integrated map of the environment at the second time period using one or more of the steps depicted in FIG. 13.

Figure 7:
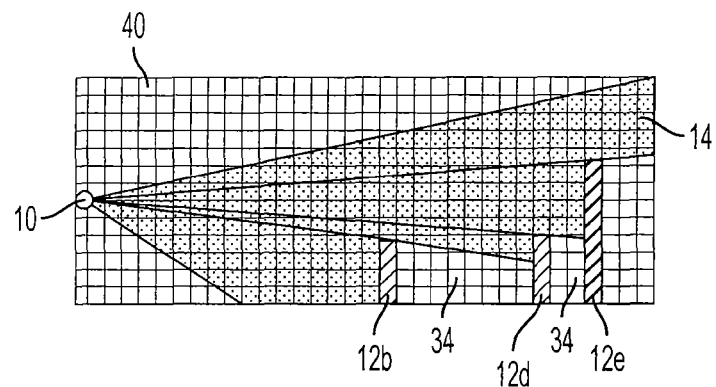
FIG. 7 is a two-dimensional view of a sensor in operation overlayed over an old integrated map of an environment.

FIG. 7 is a two-dimensional view of the sensor 10 in operation overlayed over an old integrated map 40 of the environment at the second position at the second time period. That is, the old integrated map 40 at the second time period, with the obstacles shown in FIG. 4, is equivalent to the new integrated map at the first time period, with the obstacles shown in FIG. 3. In FIG. 7, only the obstacle 12b, the obstacle 12d, and the obstacle 12e are visible because the obstacle 12a and the obstacle 12c are still in the first position. Cells which are occupied by the obstacle 12b, the obstacle 12d, and the obstacle 12e are marked as occupied space. Cells highlighted such as those in the wave 14 can be, for example, free space cells. Cells not highlighted and which are not marked as occupied space can be, for example, the unknown space cells 34.

Figure 8:
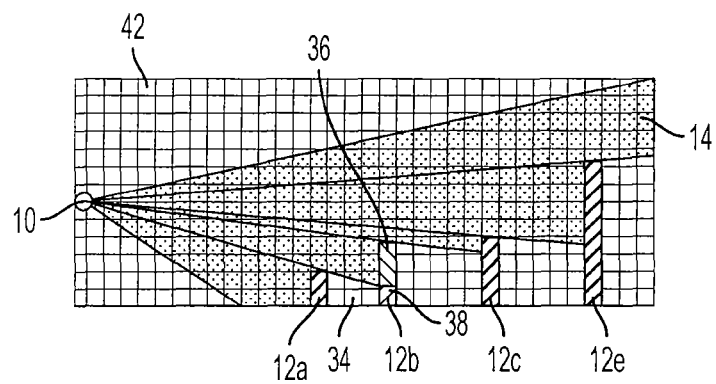
FIG. 8 is a two-dimensional view of a sensor in operation overlayed over a current instantaneous map of an environment.

FIG. 8 is a two-dimensional view of the sensor 10 in operation overlayed over a current instantaneous map 42 of the environment in the second period depicted in FIG. 4. As seen in FIG. 8, only the obstacle 12a, the obstacle 12b, the obstacle 12c, and the obstacle 12e are detected by the waves 14 since the obstacle 12d is obstructed by the obstacle 12c. Although the waves 14 only detect a top portion of the obstacle 12b, the obstacle 12e, and the obstacle 12e, the vertically-contiguous obstacles observation and the ground plane observation can be used to fill in the cells directly below the obstacle 12b, the obstacle 12c, and the obstacle 12e.

As previously noted, the vertically-contiguous obstacles observation states that two sensor readings at the same horizontal position but at different heights typically correspond to a common obstacle while the ground plane observation which states that dynamic obstacles typically extend vertically from the ground plane and travel on the ground plane. Thus, for example, the wave 14 may only detect cells in a top portion 36 of the obstacle 12b. However, cells in a bottom portion 38 below the top portion 36 extending to the ground plane, which would normally be marked as unknown space, can be marked as occupied space and part of the obstacle 12b since it is in the same horizontal location as portion 36. The same principles can be applied to mark cells as occupied space corresponding to the obstacle 12c and the obstacle 12e.

Figure 9:
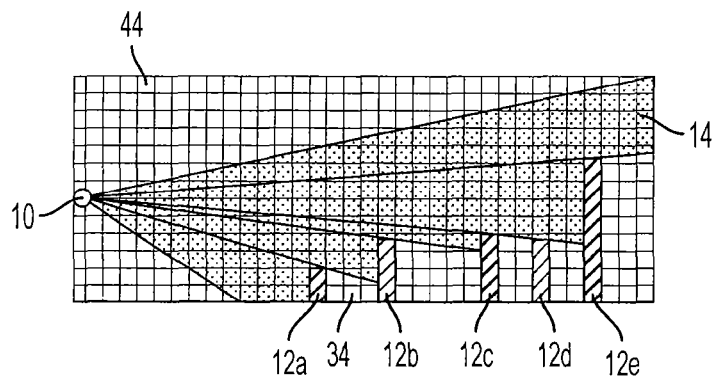
FIG. 9 is a two-dimensional view of a sensor in operation overlayed over a new integrated map of an environment.

FIG. 9 is a two-dimensional view of the sensor 10 in operation overlayed over a new integrated map 44 of the environment in the second time period. The old integrated map 40 in FIG. 7 is integrated with the current instantaneous map 42 in FIG. 8 to form the new integrated map 44 in FIG. 9. In FIG. 9, cells which correspond to free space cells in the current instantaneous map 42 are marked as free space in the new integrated map 44. Furthermore, cells which are marked as occupied space in the current instantaneous map 42 are marked as occupied space in the new integrated map 44.

However, cells which are marked as free space in the current instantaneous map 42, but which are marked as occupied space in the old integrated map 40, are then identified. This is because cells which were in occupied space at the first time period, but which are free space in the second time period indicate that the obstacle corresponding to the occupied space has moved between the first time period and the second time period. Thus, using the vertically-contiguous obstacles observation and the ground plane observation, the cells directly below the identified cell are marked as free space. In FIG. 9, however, no such cells fit the criteria, thus none of the cells are identified as being marked as free space in the current instantaneous map 42, but which are marked as occupied space in the old integrated map 40.

Then, cells which are marked as unknown space in the current instantaneous map 42 are compared with the corresponding cells in the old integrated map 40. When the cells are marked as unknown space in the current instantaneous map and are marked as occupied space in the old integrated map, the corresponding cells in the new integrated map 44 are marked as occupied space. When the cells are marked as unknown space in the current instantaneous map 42 and are marked as free space in the old integrated map 40, the corresponding cells in the new integrated map 44 are marked as free space. When the cells are marked as unknown space in the current instantaneous map 42 and are marked as unknown space in the old integrated map 40, the corresponding cells in the new integrated map 44 are marked as unknown space.

This is done because the last reliable data is from the old integrated map 40. Thus, for example, the obstacle 12d is completely obscured by the obstacle 12c. Since all of the cells corresponding to the obstacle 12d are marked as unknown space in the current instantaneous map, the vertically-contiguous obstacles observation and the ground plane observation are not used. Therefore, the data from the old integrated 40 map are used, and the cells corresponding to the obstacle 12d in the new integrated map 44 are accordingly mapped as occupied space. The current integrated map 44 in the second period is also the old integrated map 44 in the third time period.

Figure 10:
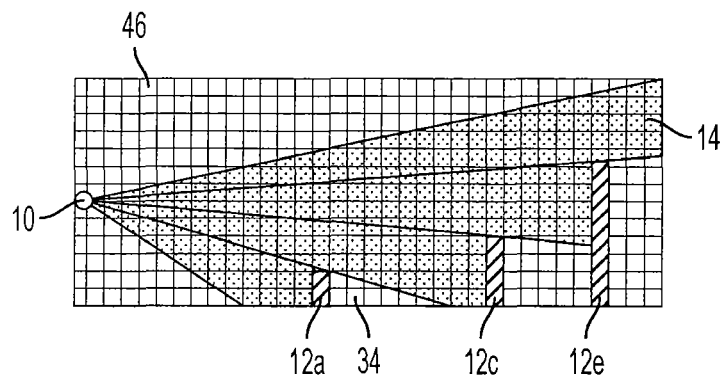
FIG. 10 is a two-dimensional view of a sensor in operation overlayed over a current instantaneous map of an environment.

FIG. 10 is a two-dimensional view of a sensor in operation overlayed over a current instantaneous map 46 of the environment in the third time period. As seen in FIG. 5, the obstacle 12b has moved from the second position to the third position in the third time period. Thus, in the current instantaneous map 46, only the obstacle 12a, the obstacle 12c, and the obstacle 12e are visible since the obstacle 12b has moved and the obstacle 12d is completely obscured by the obstacle 12c.

Figure 11:
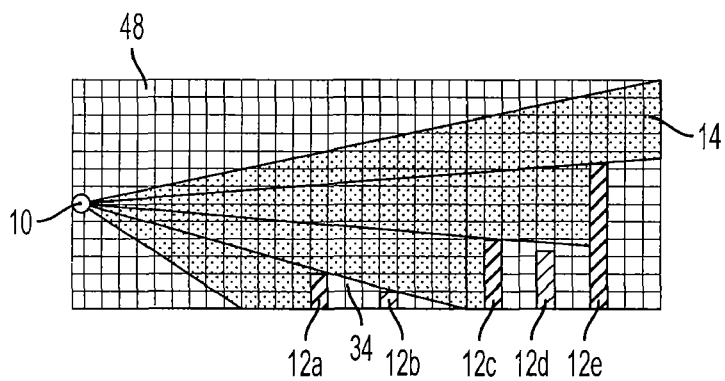
FIG. 11 is a two-dimensional view of a sensor in operation overlayed over a conventional integrated map of an environment.

FIG. 11 is a two-dimensional view of the sensor 10 in operation overlayed over a conventional integrated map 48 of the environment. In the conventional integrated map 48, cells which correspond to free space cells in the current instantaneous map 46 in FIG. 10 are marked as free space cells. Furthermore, cells which are marked as occupied space in the current instantaneous map 46 are marked as occupied space in the conventional integrated map 48. As seen in FIG. 11, cells in the conventional integrated map 48 which corresponded to cells marked as unknown space in the current instantaneous map 46 are marked according to the corresponding cells in the old integrated map 44.

Thus, when the cells marked as unknown space in the current instantaneous map 46 are marked as occupied space in the old integrated map 44, the corresponding cells in the conventional integrated map 48 are marked as occupied space. When the cells marked as unknown space in the current instantaneous map 46 are marked as free space in the old integrated map 44, the corresponding cells in the conventional integrated map 48 are marked as free space. When the cells are marked as unknown space in the current instantaneous map 46 and are marked as unknown space in the old integrated map 44, the corresponding cells in the conventional integrated map 48 are marked as unknown space.

Since the conventional integrated map 48 does not use the vertically-contiguous obstacles observation or the ground plane observation, partial remnants of obstacles can remain in the conventional integrated map 48 even when the obstacle has moved. As seen in FIG. 11, the obstacle 12*b* partially remains even though the obstacle 12*b* has moved in the third time period as depicted in FIG. 5. This is because the remaining portion of the obstacle 12*b* corresponds to cells marked as unknown in the current instantaneous map 46. Thus, the data from the old integrated map 44 in FIG. 9 is used, which still depicts the cells corresponding to the remaining portion of the obstacle 12*b* as being occupied space.

Figure 12:
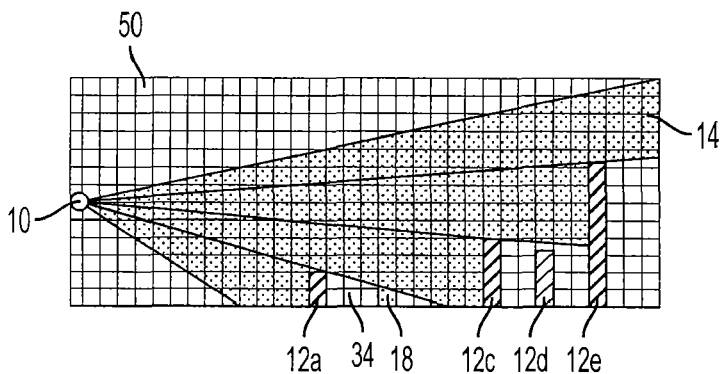
FIG. 12 is a two-dimensional view of a sensor in operation overlayed over a new integrated map of an environment.

FIG. 12 is a two-dimensional view of the sensor 10 in operation overlayed over a new integrated map 50 of the environment. In contrast, using the vertically-contiguous obstacles observation and the ground plane observation, the present invention properly marks the cells 18 corresponding to where the obstacle 12*b* was formerly at as free space. The top portion of the obstacle 12*b* is detected to be free space in the current instantaneous map 46 in FIG. 10. Since the top portion of the obstacle 12*b* was also marked as occupied space in the old integrated map 44 in FIG. 9, it means that the obstacle 12*b* and its corresponding cells have moved from the second location in the third time period. Thus, cells below the top portion of the obstacle 12*b* and having a same associated horizontal distance corresponding to the remaining portion of the obstacle 12*b* are also marked as free space as indicated by the shading.

In one embodiment, the cells having the same associated horizontal distance which are below the top portion of the obstacle 12*b* and cells indicating the ground level are marked as free space. In another embodiment, if a height of the obstacle is known, then the height of the obstacle can be used to determine an amount of cells below the top portion of the obstacle 12*b* should be marked as free cells. This can be useful when two obstacles are stacked, for example, on top of another such that they have the same associated horizontal distance.

Thus, when a first obstacle on top of a second obstacle is detected as having moved as indicated by one or more cells corresponding to the first obstacle detected as being a free space in the current instantaneous map 46, but the cells corresponding to the second obstacle is marked as unknown space in the current instantaneous map 46, only the cells corresponding to the first obstacle are marked as free space in the new integrated map 50. This can reduce a likelihood that the cells corresponding to the second obstacle are inadvertently or erroneously marked as free space in the new integrated map 50 when it is unknown whether the second obstacle has moved or not.

As seen in FIG. 12, the obstacle 12*d* also remains in the new integrated map 50. Even if the obstacle 12*d* had moved along with the obstacle 12*b*, the obstacle 12*d* would remain in the new integrated map 50 because the obstacle 12*d* is completely obstructed by the obstacle 12*c*. Thus, no portion of the obstacle 12*d* can be detected as free space in the current instantaneous map 46 and the status of the cells from the old integrated map 44 would be used for the cells corresponding to the obstacle 12*d*.

Advantageously by using the vertically-contiguous obstacles observation and the ground plane observation, the present invention reduces an amount of obstacles that remain providing a better and more accurate depiction of the environment. As seen in a comparison between a conventional integrated map 48 in FIG. 11 and the new integrated map 50 of the present invention in FIG. 12, portions of the obstacle 12*b* remain in the conventional integrated map 48, while the obstacle 12*b* is removed in the new integrated map 50 of the present invention. The new integrated map 50 of the present invention can therefore more accurately depict the environment as disclosed in FIG. 5.

In one embodiment, each of the cells in the old integrated map 40, the current instantaneous map 42, the new/old integrated map 44, the current instantaneous map 46, and the new integrated map 44 can have a cell data set associated with it. The cell data set, for example, can include data regarding whether the cell should be marked as free space, occupied space, or unknown space. The cell data set can include location data such as associated horizontal location and associated vertical location regarding the relative location of the cell. Furthermore, the cell data set can include information regarding any associated cells such as if the cell is part of an obstacle. If the cell is part of the obstacle, the cell data set can also include the height of the obstacle and where exactly the cell is located on the obstacle. The cell data set can be used by the control unit 6 to generate the old integrated map 40, the current instantaneous map 42, the new/old integrated map 44, the current instantaneous map 46, and/or the new integrated map 44.

FIG. 13 depicts a method for mapping environments containing dynamic obstacles according to an embodiment of the present invention. In Step S1300, an old integrated map is formed. In Step S1302, a current instantaneous map is formed. In Step S1304, free cells which are free space within the current instantaneous map are determined. In Step S1306, occupied space which are occupied cells within the current instantaneous map are determined. In Step 1308, unmarked cells in the new integrated map are marked as free cells using the vertically-contiguous obstacles observation and the ground plane observation. In Step S1310, the current instantaneous map is integrated with the old integrated map to form the new integrated map.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for mapping an environment containing dynamic obstacles comprising the steps of:

forming a current instantaneous map of the environment using a processor;

determining free cells which are free-space within the current instantaneous map using the processor;

determining occupied cells which are occupied-space within the current instantaneous map using the processor; and forming a new integrated map using the processor by integrating the current instantaneous map of the environment with an old integrated map of the environment, the forming including marking cells in the new integrated map as free-space or occupied-space based on the corresponding cells in the current instantaneous map and marking some of unmarked cells in the new integrated map as free-space based at least on the some of the unmarked cells being disposed along a line between a first cell and a second cell, the line being substantially perpendicular to a ground plane.

2. The method of claim 1 wherein the first cell is a corresponding cell in the new integrated map which is marked as free-space in the current instantaneous map and which is marked as occupied-space in the old integrated map.

3. The method of claim 2 wherein the second cell is part of the ground plane.

4. The method of claim 1 wherein the first cell and the second cell are marked as occupied-space in the old integrated map, but have one or more cells therebetween marked as free-space in the current instantaneous map.

5. The method of claim 1 wherein the step of forming the current instantaneous map of the environment includes taking a union of at least two instantaneous maps of the environment.

6. The method of claim 1 wherein the step of forming the new integrated map includes marking any remaining unmarked cells in the new integrated map as free-space, occupied-space, or unknown-space based on the corresponding cells in the old integrated map.

7. A method for mapping an environment of an automobile containing dynamic obstacles comprising the steps of:

forming a map of the environment at a first time using a processor;

determining free-space cells within the map of the environment at the first time using the processor;

determining occupied-space cells within the map of the environment at the first time using the processor; and integrating the map of the environment at the first time with a map of the environment at a second time to form an integrated map using the processor by marking cells in the integrated map as free-space or occupied-space based on the corresponding cells in the map of the environment at the first time, marking unmarked cells in the integrated map as free-space which are below a first cell and above a second cell, have a same associated horizontal distance as the first cell, and which are located in a vertical line including the first cell that is substantially perpendicular to a ground plane and marking remaining unmarked cells as free-space, occupied-space, or unknown-space based on the corresponding cells in the map of the environment at the second time.

8. The method of claim 7 wherein the first cell is a corresponding cell in the integrated map which is marked as free-space in the map of the environment at the first time and which is marked as occupied-space in the map of the environment at the second time.

9. The method of claim 7 wherein the second cell is part of the ground plane.

10. The method of claim 7 wherein the first cell and the second cell are ends of an obstacle marked as occupied-space in the map of the environment at the second time, but having at least one cell marked as free-space in the map of the environment at the first time.

11. The method of claim 7 wherein:

the map of the environment at the first time is an instantaneous map of the environment and the map of the environment at the second time is an integrated map of the environment.

12. A system in an automobile for mapping an environment containing dynamic obstacles comprising:

a sensor unit configured to collect environmental data;

a location unit connected to the sensor unit, the location unit configured to output location data of the sensor in relation to the environment; and a control unit connected to the sensor unit and the location unit, the control unit configured to generate a new integrated map of the environment by generating a current instantaneous map of the environment formed from the environmental data collected by the sensor, marking cells in the new integrated map as free-space or occupied-space based on the corresponding cells in the current instantaneous map and marking unmarked cells in the new integrated map as free-space based at least on the unmarked cells being disposed along a line between a first cell and a second cell, the line being substantially perpendicular to a ground plane.

13. The system of claim 12 wherein the control unit marks the remaining cells which are unmarked as free-space, occupied-space, or unknown-space based on the corresponding cells in an old integrated map of the environment.

14. The system of claim 12 wherein the current instantaneous map of the environment is generated from a union of at least two instantaneous maps of the environment.

15. The method of claim 1 further comprising saving the new integrated map as a second old integrated map for use in subsequent formation of a second new integrated map.

16. The method of claim 11 wherein the step of forming the map of the environment at the first time includes taking a union of at least two instantaneous maps of the environment.

17. The system of claim 12 wherein the sensor comprises a plurality of lasers arranged in a vertical plane, the plurality of lasers configured to individually or collectively rotate in a plane substantially parallel to the ground plane.

18. The system of claim 17 wherein the plurality of lasers are positioned at different angles for collectively covering an angle on a plane perpendicular to the ground plane.

* * * * *